US012657942B2

(12) United States Patent
Zheng et al.

(10) Patent No.: US 12,657,942 B2
(45) Date of Patent: Jun. 16, 2026

(54) DOCUMENT AUTHENTICITY IDENTIFICATION METHOD AND APPARATUS, COMPUTER-READABLE MEDIUM, AND ELECTRONIC DEVICE

(71) Applicant: Tencent Technology (Shenzhen) Company Limited, Shenzhen (CN)

(72) Inventors: Yan Zheng, Shenzhen (CN); Lei Wu, Shenzhen (CN); Haoyu Cao, Shenzhen (CN); Bing Liu, Shenzhen (CN); Yiqing Hu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 358 days.

(21) Appl. No.: 17/965,549

(22) Filed: Oct. 13, 2022

(65) Prior Publication Data

US 2023/0030792 A1     Feb. 2, 2023

Related U.S. Application Data

(63) Continuation of application No. PCT/CN2021/121138, filed on Sep. 28, 2021.

(30) Foreign Application Priority Data

Oct. 29, 2020    (CN) .......................... 202011179992.0

(51) Int. Cl.
| | |
|---|---|
| *G06V 20/00* | (2022.01) |
| *G06T 3/40* | (2006.01) |
| *G06T 7/73* | (2017.01) |
| *G06V 10/25* | (2022.01) |
| *G06V 10/77* | (2022.01) |
| *G06V 10/82* | (2022.01) |
| *G06V 20/40* | (2022.01) |

(Continued)

(52) U.S. Cl.
CPC ................ *G06V 20/95* (2022.01); *G06T 3/40* (2013.01); *G06T 7/73* (2017.01); *G06V 10/7715* (2022.01);

(Continued)

(58) Field of Classification Search
CPC .... G06V 20/95; G06V 30/40; G06V 10/7715; G06V 10/82; G06T 7/73; G06T 3/40;

(Continued)

(56) References Cited

U.S. PATENT DOCUMENTS

| | | | |
|---|---|---|---|
| 2013/0182128 A1* | 7/2013 | Amtrup ................ | H04N 1/3878 |
| | | | 348/222.1 |
| 2017/0270508 A1* | 9/2017 | Roach .................. | G06V 30/162 |

(Continued)

FOREIGN PATENT DOCUMENTS

| | | |
|---|---|---|
| CN | 108229499 A | 6/2018 |
| CN | 109446900 A | 3/2019 |

(Continued)

OTHER PUBLICATIONS

Rao, Chengping, and Yang Liu. "Three-dimensional convolutional neural network (3D-CNN) for heterogeneous material homogenization." Computational Materials Science 184, Feb. 14, 2020. (Year: 2020).*

(Continued)

*Primary Examiner* — Ross Varndell
*Assistant Examiner* — Nhut Huy Pham
(74) *Attorney, Agent, or Firm* — ArentFox Schiff LLP

(57) ABSTRACT

A document authenticity identification method is provided. A dynamic anti-counterfeiting point is detected in each document image of a subset of a plurality of document images. A static anti-counterfeiting point is detected in a document image of the plurality of document images. A static anti-counterfeiting point feature is generated based on image feature information of the static anti-counterfeiting point that is extracted from the document image. A dynamic anti-counterfeiting point feature is generated based on image feature information of the dynamic anti-counterfeiting point and variation feature information of the dynamic anti- (Continued)

counterfeiting point. A first authenticity result corresponding to the static anti-counterfeiting point is determined based on the static anti-counterfeiting point feature. A second authenticity result corresponding to the dynamic anti-counterfeiting point is determined based on the dynamic anti-counterfeiting point feature. Authenticity of the document is determined based on the first authenticity result and the second authenticity result.

20 Claims, 5 Drawing Sheets

(51) Int. Cl.
 _G06V 30/40_ (2022.01)
 _G06V 30/41_ (2022.01)
(52) U.S. Cl.
 CPC .............. _G06V 10/82_ (2022.01); _G06V 30/40_ (2022.01); _G06T 2207/10016_ (2013.01); _G06T 2207/20084_ (2013.01); _G06T 2207/30176_ (2013.01)
(58) Field of Classification Search
 CPC . G06T 2207/10016; G06T 2207/20084; G06T 2207/30176
 See application file for complete search history.

(56) References Cited

U.S. PATENT DOCUMENTS

| | | | |
|---|---|---|---|
| 2020/0304650 A1* | 9/2020 | Roach | .................. G06Q 20/042 |
| 2021/0124919 A1* | 4/2021 | Balakrishnan | ....... B42D 25/309 |

FOREIGN PATENT DOCUMENTS

| | | | | |
|---|---|---|---|---|
| CN | 110210312 A | * | 9/2019 | ............. G06V 40/45 |
| CN | 110427972 A | | 11/2019 | |
| CN | 110516739 A | | 11/2019 | |
| CN | 111275105 A | | 6/2020 | |
| CN | 111291797 A | * | 6/2020 | ............. G06F 18/22 |
| CN | 111324874 A | | 6/2020 | |
| CN | 112200136 A | | 1/2021 | |

OTHER PUBLICATIONS

E. Shelhamer, J. Long and T. Darrell, "Fully Convolutional Networks for Semantic Segmentation," in IEEE Transactions on Pattern Analysis and Machine Intelligence, vol. 39, No. 4, pp. 640-651, Apr. 1, 2017. (Year: 2017).*
Rao, Chengping et al. "Three-dimensional convolutional neural network (3D-CNN) for heterogeneous material homogenization." Computational Materials Science, published Jun. 10, 2020 (Year: 2020).*
E. Shelhamer et al. "Fully Convolutional Networks for Semantic Segmentation" IEEE, published 2017 (Year: 2017).*
International Search Report and Written Opinion issued in International Application No. PCT/CN2021/121138, mailed Dec. 29, 2021, with English Translation, 10 pages.
Hong Kong Smart Identity Card includes advanced security features, Immigration Department, The Government of the Hong Kong Special Administrative Region.
Office Action received for Chinese Patent Application No. 202011179992.0, mailed on Mar. 12, 2025, 24 pages (13 pages of English Translation and 11 pages of Original Document).

* cited by examiner

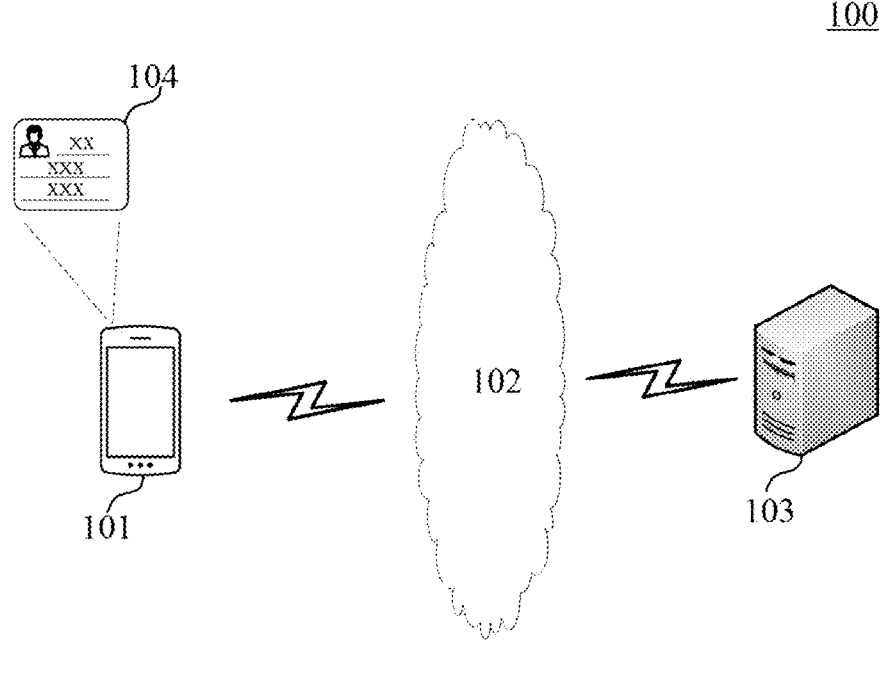

| | |
|---|---|
| Detect a dynamic anti-counterfeiting point and a static anti-counterfeiting point in each of a plurality of certificate images of a target certificate, the plurality of certificate images being obtained by capturing images of the target certificate from different angles | S210 |
| Extract image feature information of a position of the static anti-counterfeiting point to obtain a static anti-counterfeiting point feature, and extract image feature information of a position of the dynamic anti-counterfeiting point and variation feature information of the dynamic anti-counterfeiting point in the plurality of certificate images to obtain a dynamic anti-counterfeiting point feature | S220 |
| Identify a first authenticity result corresponding to the static anti-counterfeiting point based on the static anti-counterfeiting point feature, and identify a second authenticity result corresponding to the dynamic anti-counterfeiting point based on the dynamic anti-counterfeiting point feature | S230 |
| Determine authenticity of the target certificate according to the first authenticity result and second authenticity result | S240 |

DOCUMENT AUTHENTICITY IDENTIFICATION METHOD AND APPARATUS, COMPUTER-READABLE MEDIUM, AND ELECTRONIC DEVICE

RELATED APPLICATIONS

The present application is a continuation of International Application No. PCT/CN2021/121138, entitled "CERTIFICATE AUTHENTICITY IDENTIFICATION METHOD AND APPARATUS, COMPUTER-READABLE MEDIUM, AND ELECTRONIC DEVICE" and filed on Sep. 28, 2021, which claims priority to Chinese Patent Application No. 202011179992.0, entitled "CERTIFICATE AUTHENTICITY IDENTIFICATION METHOD AND APPARATUS, COMPUTER-READABLE MEDIUM, AND ELECTRONIC DEVICE" and filed on Oct. 29, 2020. The entire disclosures of the prior applications are hereby incorporated by reference in their entirety.

FIELD OF THE TECHNOLOGY

This application relates to the field of computer and communication technologies, including document authenticity identification, such as certificate authenticity identification.

BACKGROUND OF THE DISCLOSURE

In daily life, people often need to upload document images, including certificate images (such as an ID card, a driver's license, and a business license), on the Internet for identity or qualification verification based on the certificate images. However, during identity or qualification verification, a certificate image uploaded by a user may be a maliciously forged certificate image. Therefore, it is necessary to identify the authenticity of the certificate. However, a certificate authenticity identification method proposed in the related technology has problems such as low identification accuracy.

SUMMARY

Embodiments of this disclosure include a document authenticity identification method and apparatus, a non-transitory computer-readable storage medium, and an electronic device. The embodiments can more precisely identify the authenticity of the document.

Other features and advantages of this disclosure become apparent through the following detailed descriptions, or may be partially learned through the practice of this disclosure.

According to an aspect of the embodiments of this disclosure, a document authenticity identification method is provided. In the method, a dynamic anti-counterfeiting point is detected in each document image of a subset of a plurality of document images. The plurality of document images includes images of different angles of a document. A static anti-counterfeiting point is detected in a document image of the plurality of document images. A static anti-counterfeiting point feature is generated based on image feature information of the static anti-counterfeiting point that is extracted from the document image. A dynamic anti-counterfeiting point feature is generated based on image feature information of the dynamic anti-counterfeiting point and variation feature information of the dynamic anti-counterfeiting point and the variation feature information of the dynamic anti-counterfeiting point. Each of the image feature information of the dynamic anti-counterfeiting point and the variation feature information of the dynamic anti-counterfeiting point is determined from the subset of the plurality of document images. A first authenticity result corresponding to the static anti-counterfeiting point is determined based on the static anti-counterfeiting point feature. A second authenticity result corresponding to the dynamic anti-counterfeiting point is determined based on the dynamic anti-counterfeiting point feature. Authenticity of the document is determined based on the first authenticity result and the second authenticity result.

According to an aspect of the embodiments of this disclosure, an information processing apparatus including processing circuitry is provided. The processing circuitry is configured to detect a dynamic anti-counterfeiting point in each document image of a subset of a plurality of document images. The plurality of document images includes images of different angles of a document. The processing circuitry is configured to detect a static anti-counterfeiting point in a document image of the plurality of document images. The processing circuitry is configured to generate a static anti-counterfeiting point feature based on image feature information of the static anti-counterfeiting point that is extracted from the document image. The processing circuitry is configured to generate a dynamic anti-counterfeiting point feature based on image feature information of the dynamic anti-counterfeiting point and variation feature information of the dynamic anti-counterfeiting point. Each of the image feature information of the dynamic anti-counterfeiting point and the variation feature information of the dynamic anti-counterfeiting point is determined from the subset of the plurality of document images. A first authenticity result corresponding to the static anti-counterfeiting point is determined based on the static anti-counterfeiting point feature. A second authenticity result corresponding to the dynamic anti-counterfeiting point is determined based on the dynamic anti-counterfeiting point feature. Further, the processing circuitry is configured to determine authenticity of the document based on the first authenticity result and the second authenticity result.

According to an aspect of the embodiments of this disclosure, a non-transitory computer-readable storage medium is provided. The non-transitory computer-readable storage medium stores instructions which when executed by a processor cause the processor to perform the document authenticity identification method according to the foregoing embodiments.

According to an aspect of the embodiments of this disclosure, an electronic device is provided, including: one or more processors; and a storage apparatus, configured to store one or more programs, the one or more programs, when executed by the one or more processors, causing the one or more processors to implement the document authenticity identification method according to the foregoing embodiments.

According to an aspect of the embodiments of this disclosure, a computer program product or a computer program is provided. The computer program product or the computer program includes computer instructions, and the computer instructions are stored in a computer-readable storage medium. A processor of the computer device reads the computer instructions from the computer-readable storage medium, and the processor executes the computer instructions, to cause the computer device to perform the document authenticity identification method according to the foregoing embodiments.

In the technical solutions according to some embodiments of this disclosure, a dynamic anti-counterfeiting point and a static anti-counterfeiting point in each of a plurality of certificate images of a target certificate are detected, so that image feature information of a position of the static anti-counterfeiting point can be extracted to obtain a static anti-counterfeiting point feature, and image feature information of a position of the dynamic anti-counterfeiting point and variation feature information of the dynamic anti-counterfeiting point in the plurality of certificate images can be extracted to obtain a dynamic anti-counterfeiting point feature. A first authenticity result corresponding to the static anti-counterfeiting point is identified based on the static anti-counterfeiting point feature, and a second authenticity result corresponding to the dynamic anti-counterfeiting point is identified based on the dynamic anti-counterfeiting point feature, thereby determining the authenticity of the target certificate according to the first authenticity result and the second authenticity result. It can be seen that the technical solutions of the embodiments of this disclosure can identify the authenticity of the certificate based on the dynamic anti-counterfeiting point and the static anti-counterfeiting point on the certificate image. For the dynamic anti-counterfeiting point, not only the image feature information of the position of the dynamic anti-counterfeiting point, but also the variation feature information of the dynamic anti-counterfeiting point in the plurality of certificate images is considered. Thus, the authenticity of the target certificate can be identified based on the first authenticity result corresponding to the static anti-counterfeiting point and the second authenticity result corresponding to the dynamic anti-counterfeiting point, thereby improving the accuracy of the certificate authenticity identification.

It is to be understood that the foregoing general description and the following detailed description are merely for illustration and explanation purposes and are not intended to limit this disclosure.

BRIEF DESCRIPTION OF THE DRAWINGS

FIG. 1 is a schematic diagram of an exemplary system architecture to which a technical solution according to an embodiment of this disclosure is applicable.

FIG. 2 is a flowchart of a certificate authenticity identification method according to an embodiment of this disclosure.

DESCRIPTION OF EMBODIMENTS

Figure 3:
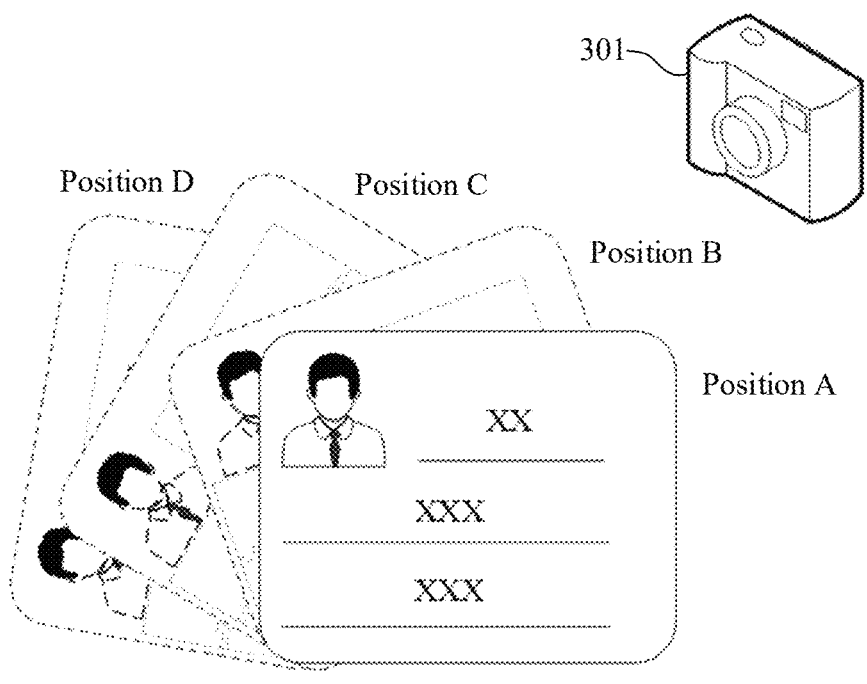
FIG. 3 is a schematic diagram of a scenario in which a plurality of certificate images are obtained by capturing images of a target certificate from different angles according to an embodiment of this disclosure.

Exemplary implementations are now described more comprehensively with reference to the accompanying drawings. However, the exemplary implementations can be implemented in various forms, and it is not to be understood as being limited to the examples described herein. Conversely, the implementations are provided to make this disclosure more comprehensive and complete, and convey the idea of the exemplary implementations to a person skilled in the art.

In addition, the described characteristics, structures, or features may be combined in one or more embodiments in any appropriate manner. In the following descriptions, a lot of specific details are provided to give a comprehensive understanding of the embodiments of this disclosure. However, a person skilled in the art is to be aware that, the technical solutions in this disclosure may be implemented without one or more of the particular details, or another method, unit, apparatus, or step may be used. In other cases, well-known methods, apparatuses, implementations, or operations are not shown or described in detail, to avoid obscuring the aspects of this disclosure.

The block diagrams shown in the accompanying drawing are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

"A plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

A certificate can refer to a document, such as a license, used to prove identity, experience, qualification, or the like. For example, the certificate may be a credential and a file. There are many types of certificates, such as an IC contactless smart certificate, which has a built-in chip that can provide certain storage space. In addition to storing basic information of an owner of the certificate, such as name, gender, date of birth, and address, the certificate further stores a photo of the owner of the certificate. Regardless of the type of certificate, anti-counterfeiting identification is usually set up to facilitate verification of the authenticity of the certificate. While the disclosure describes various aspects using certificates as an example, it is noted that the various aspects can also be used to authenticate other document types.

In order to verify the authenticity of the certificate, information read from a chip (such as an IC contactless smart certificate) is usually compared with information derived from an identity data information database for consistency, or a facial photo read from the chip and a photo printed on a surface of the certificate are compared for similarity, to determine the authenticity of the certificate.

However, this scheme of authenticity verification needs to rely on a dedicated chip-reading tool to read information, and a verification process also requires manual comparison. The reliability of the entire verification process is closely related to the experience and subjective identification ability of staff. Each person has a different subjective identification ability and a different focus. The comparison process not only lacks scientific basis, but also lacks a uniform standard, and is vulnerable to various factors.

Based on this, an embodiment of this disclosure proposes a new certificate authenticity identification method, in which the authenticity of the certificate may be identified based on a dynamic anti-counterfeiting point and a static anti-counterfeiting point on a certificate image. For the static anti-counterfeiting point, image feature information of a position of the static anti-counterfeiting point is considered. For the dynamic anti-counterfeiting point, not only image feature information of a position of the dynamic anti-counterfeiting point, but also variation feature information of the dynamic anti-counterfeiting point between a plurality of certificate images is considered. A first authenticity result corresponding to the static anti-counterfeiting point and a second authenticity result corresponding to the dynamic anti-counterfeiting point may be determined first. Then, the authenticity of the target certificate may be identified according to the first authenticity result and the second authenticity result, thereby improving the accuracy of the certificate authenticity identification.

Specifically, in a system architecture of this disclosure, as shown in FIG. 1, a system architecture 100 may include a terminal 101 (which may be a smart phone as shown in FIG. 1, or may be a tablet computer, a portable computer, a desktop computer, or the like), a network 102, and a server 103. The network 102 is configured to provide a medium of a communication link between the terminal 101 and the server 103. The network 102 may include, but is not limited to, a wireless network and a wired network. The wired network includes, but is not limited to, at least one of the following: a wide area network, a metropolitan area network, or a local area network. The wireless network includes, but is not limited to, at least one of the following: Bluetooth, WI-FI, near field communication (NFC), a cellular mobile communication network, or the like. A user may interact with the server 103 through the network 102 by using the terminal 101, to receive or send messages or the like.

It is to be understood that a quantity of the terminals 101, a quantity of the networks 102, and a quantity of the servers 103 in FIG. 1 are merely exemplary. There may be any quantity of the terminals 101, the networks 102 and the servers 103 according to an implementation requirement. For example, the server 103 may be a server cluster including a plurality of servers.

In an embodiment of this disclosure, the terminal 101 may capture, from different angles, images of a target certificate 104 that needs to be subjected to authenticity identification, and then send a plurality of certificate images captured from different angles to the server 103 through the network 102. After receiving the plurality of certificate images, the server 103 detects a static anti-counterfeiting point and a dynamic anti-counterfeiting point in each certificate image, and may then extract image feature information of a position of the static anti-counterfeiting point to obtain a static anti-counterfeiting point feature, and extract image feature information of a position of the dynamic anti-counterfeiting point and the variation feature information of the dynamic anti-counterfeiting point in the plurality of certificate images to obtain a dynamic anti-counterfeiting point feature. After obtaining the static anti-counterfeiting point feature and the dynamic anti-counterfeiting point feature, the server 103 may identify an authenticity result corresponding to each static anti-counterfeiting point based on the static anti-counterfeiting point feature, identify an authenticity result corresponding to each dynamic anti-counterfeiting point based on the dynamic anti-counterfeiting point feature, and then determine the authenticity of the target certificate according to the authenticity result corresponding to each static anti-counterfeiting point and the authenticity result corresponding to each dynamic anti-counterfeiting point.

In an embodiment of this disclosure, after identifying the authenticity of the target certificate 104, the server 103 may return an identification result to the terminal 101 through the network 102, and then the terminal 101 may display the identification result of the target certificate 104 to the user.

The certificate authenticity identification method according to the embodiments of this disclosure may be executed by a computer device that includes a terminal (for example, the terminal 101) or a server (for example, the server 103). The server may be an independent physical server, or a server cluster composed of a plurality of physical servers or a distributed system, or a cloud server that provides cloud computing services. The terminal may be, but is not limited to, a mobile phone, a computer, an intelligent voice interactive device, an intelligent home appliance, an in-vehicle terminal, or the like. The terminal and the server may be directly or indirectly connected in a wired or wireless communication manner, which is not limited in this disclosure.

The embodiments of this disclosure are generally executed by the server 103. The server 103 is configured to receive the plurality of certificate images of the target certificate 104 uploaded by the terminal 101, and identify the authenticity of the target certificate 104 based on the plurality of certificate images. Accordingly, a certificate authenticity identification apparatus is generally arranged in the server 103. However, it is readily understood by a person skilled in the art that the certificate authenticity identification method according to the embodiment of this disclosure may also be executed by the terminal 101. Accordingly, the certificate authenticity identification apparatus may also be arranged in the terminal 101, which is not specifically limited in this exemplary embodiment. For example, in an exemplary embodiment, the terminal 101 is configured to capture and acquire the plurality of certificate images of the target certificate 104, and identify the authenticity of the target certificate 104 based on the certificate authenticity identification method according to this disclosure.

When the certificate authenticity identification method according to the embodiments of this disclosure is executed by the server 103, a client running on the terminal 101 may implement the authentication of the certificate by requesting a service via a web page call based on triggering by a user. When the certificate authenticity identification method according to the embodiments of this disclosure is executed by the terminal 101, a client running on the terminal 101 may call a software development kit (SDK) for authentication to provide a certificate authentication function. It is also possible to quickly identify the authenticity of the certificate by calling the SDK through the client to determine whether the captured certificate images are standardized, in combination with an authentication service provided by the server 103.

The implementation details of the technical solutions in the embodiments of this disclosure are described below in detail.

FIG. 2 is a flowchart of a certificate authenticity identification method according to an embodiment of this disclosure. The certificate authenticity identification method may be performed by a computer device having a computing processing function, for example, by the server 103 or the terminal 101 shown in FIG. 1. Referring to FIG. 2, the certificate authenticity identification method includes at least S210 to S240. A detailed description is as follows.

In step S210, a dynamic anti-counterfeiting point and a static anti-counterfeiting point are detected. The dynamic anti-counterfeiting point and the static anti-counterfeiting point can be detected in each of a plurality of certificate images of a target certificate, the plurality of certificate images being obtained by capturing images of the target certificate from different angles. In an example, a dynamic anti-counterfeiting point is detected in each document image of a subset of a plurality of document images, the plurality of document images including images of different angles of a document, and a static anti-counterfeiting point is detected in a document image of the plurality of document images.

In an embodiment of this disclosure, the target certificate or document, may be a physical certificate such as an identity card, a passport, a social security card, or an insurance card. The dynamic anti-counterfeiting point may be an identification with such an anti-counterfeiting function that attribute information changes when the certificate is in different postures, for example, color-changing ink, dynamic printing, hologram, laser image, or three-dimensional relief. When the certificate is in different postures, the dynamic anti-counterfeiting point on the certificate changes by a certain extent, and the change of the dynamic anti-counterfeiting point conforms to a certain change rule. For example, the attribute information such as color, clarity, texture, or shape of the dynamic anti-counterfeiting point of the certificate changes. The static anti-counterfeiting point is an anti-counterfeiting identification that does not change with the angle of the certificate or lighting.

In general, a counterfeit certificate usually has no anti-counterfeiting point, or has only some anti-counterfeiting points, or has anti-counterfeiting points different from those of a real certificate (for example, dynamic anti-counterfeiting points on some counterfeit certificates will not change with the angle or lighting, or a change mode of the dynamic anti-counterfeiting point on the counterfeit certificate is different from that on the real certificate). Therefore, the plurality of certificate images obtained by capturing images of the target certificate from different angles can be acquired to comprehensively determine an authenticity identification result of the certificate based on the dynamic anti-counterfeiting point and the static anti-counterfeiting point.

In an embodiment of this disclosure, an image capture device may capture a video stream containing the target certificate from different angles, and then acquire a plurality of certificate images from the video stream; alternatively, the image capture device may directly capture a plurality of certificate images of the target certificate from different capture angles. Specifically, after detecting a certificate image capture request, the image capture device may turn on a camera to collect images of the target certificate from different angles, so as to acquire the video stream or the plurality of certificate images captured from different angles.

In an embodiment of this disclosure, as shown in FIG. 3, when images of the target certificate are captured, the target certificate may be flipped by different angles, and an image capture device 301 may capture images of the target certificate flipped to different positions (such as a position A, a position B, a position C, and a position D shown in FIG. 3), thereby obtaining a video stream or a plurality of certificate images.

Figure 4:
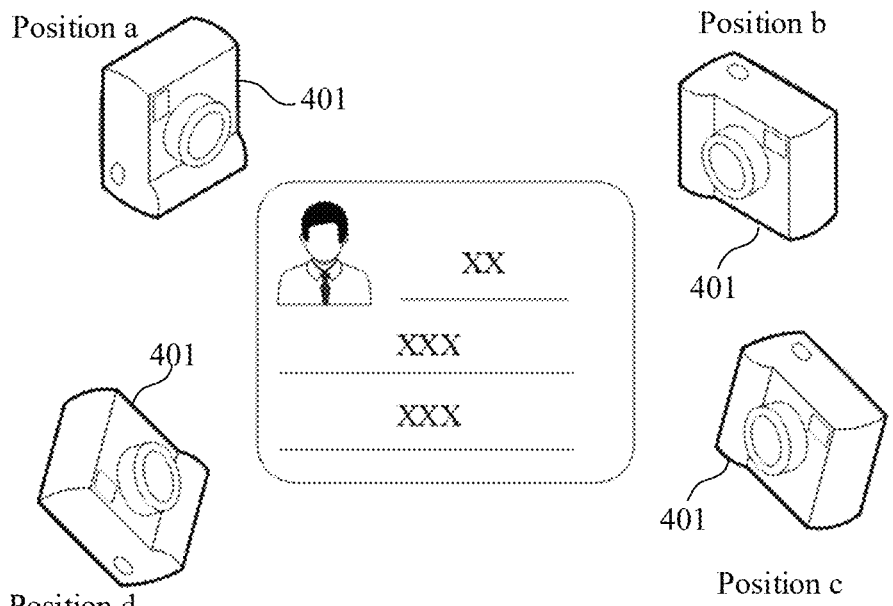
FIG. 4 is a schematic diagram of a scenario in which a plurality of certificate images are obtained by capturing images of a target certificate from different angles according to an embodiment of this disclosure.

In an embodiment of this disclosure, as shown in FIG. 4, the method of capturing images of the target certificate from different angles may further be as follows: the target certificate may be placed at a fixed position, and the image capture device 401 may be switched to different positions (such as a position a, a position b, a position c, and a position d shown in FIG. 4) to capture images of the target certificate from different capture angles, thereby obtaining a video stream or a plurality of certificate images.

In addition, in other embodiments of this disclosure, both the position of the target certificate and the position of the camera device may be changed to capture a video stream or a plurality of target certificates.

In an embodiment of this disclosure, during capture of the video stream or the plurality of certificate images of the target certificate, a position of the target certificate in a video image frame in the captured video stream or in the captured certificate image may further be detected. When the detected position of the target certificate is not in conformity with a position setting condition, a video stream or a plurality of certificate images may be captured again until the position of the target certificate in the captured video image frame or the captured certificate image is in conformity with the setting condition. In response to detecting that the position of the target certificate is in conformity with the position setting condition, the plurality of certificate images are acquired from the video image frames in the video stream.

In some embodiments, when the detected position of the target certificate is located outside of a screen of the video image frame or the certificate image, or when the detected target certificate is excessively small or excessively large in the video image frame or the certificate image (which is caused by an excessively small or excessively large distance between the camera and the target certificate during shooting), the user may be prompted to perform capture again.

In an embodiment of this disclosure, the position of the target certificate in the video image frame may be detected in the following manner (since the position of the target certificate in the certificate image is detected in a similar manner, description is made below using the detection of the position of the target certificate in the video image frame as an example):

performing down-sampling processing on the video image frame by using sequentially connected n convolution blocks to obtain n down-sampling feature maps corresponding to the n convolution blocks in a one-to-one manner, where the first convolution block of the n convolution blocks is used to perform down-sampling processing on the video image frame, and an $(i+1)$-th convolution block of the n convolution blocks is used to perform down-sampling processing on a down-sampling feature map of an $i$-th convolution block, $n>1$, and $0<i<n$;

performing up-sampling processing sequentially according to the corresponding down-sampling feature maps by using the n convolution blocks, where an $n$-th convolution block performs up-sampling processing on an $n$-th down-sampling feature map to obtain an $n$-th up-sampling feature map, an $i$-th down-sampling feature map and an up-sampling feature map of the (i+1)-th convolution block are combined to obtain a corresponding feature map of the i-th convolution block, and up-sampling processing is performed on the corresponding feature map of the i-th convolution block by using the i-th convolution block to obtain an up-sampling feature map of the i-th convolution block, the up-sampling processing and the down-sampling processing having a same sampling scale; and identifying, according to a corresponding feature map of the first convolution block of the n convolution blocks, the position of the target certificate in the video image frame.

Figures 5, 6:
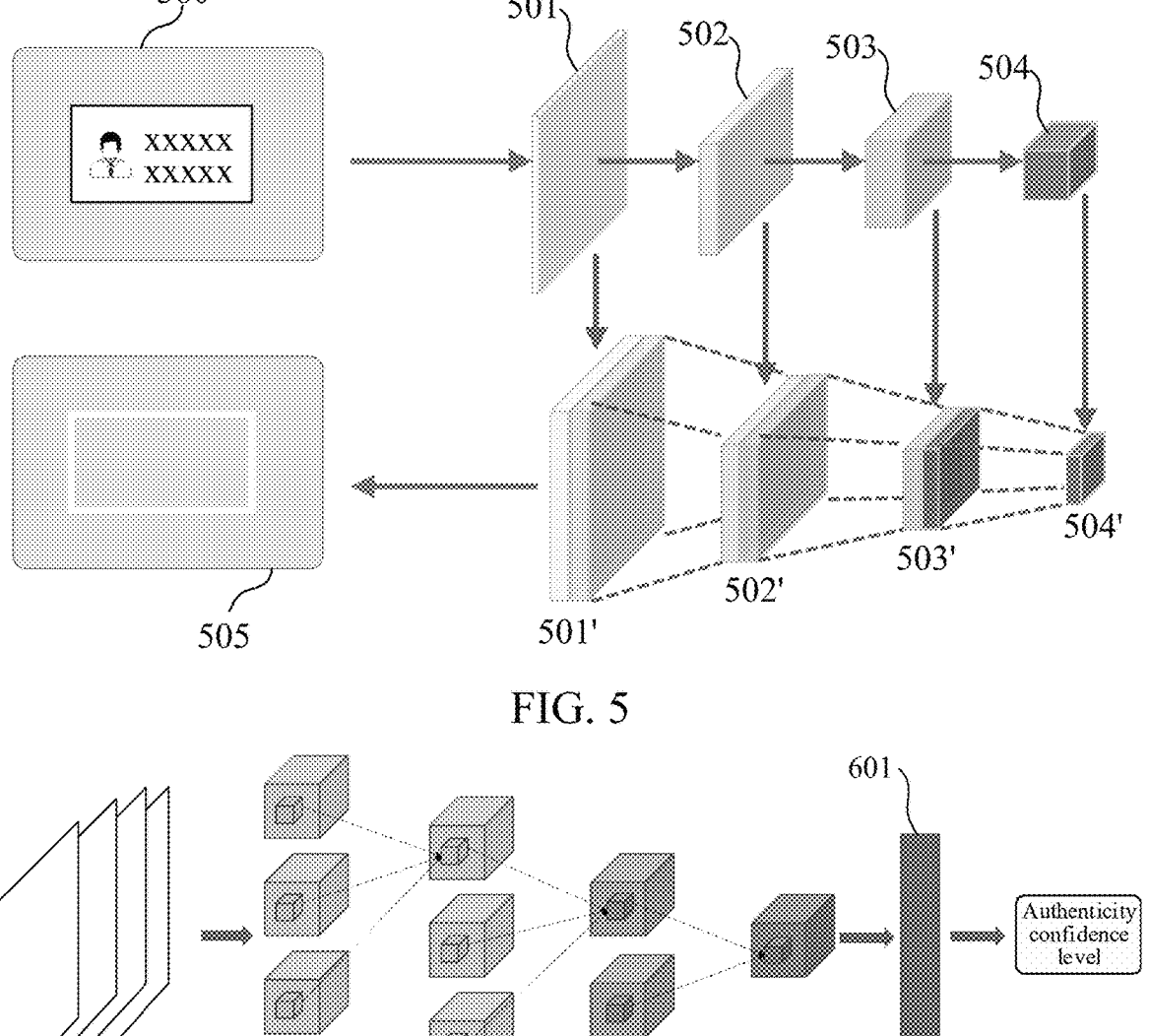
FIG. 5 is a flowchart of detecting a position of a target certificate based on image segmentation according to an embodiment of this disclosure.
FIG. 6 is a schematic diagram of identifying an authenticity result corresponding to a dynamic anti-counterfeiting point by a three-dimensional convolutional network according to an embodiment of this disclosure.

Specifically, as shown in FIG. 5, in this embodiment, description is made using four convolution blocks (n=4) as an example. Down-sampling processing is performed on a video image frame 500 based on four sequentially connected convolution blocks.

Convolution down-sampling of 2×2 (the specific scale is only an example) times is performed by using the first convolution block, to obtain a feature map 501 (the feature map 501 is a down-sampling feature map outputted by the first convolution block, that is, the first down-sampling feature map). Then, 2×2 convolution down-sampling is performed to obtain a feature map 502 (the feature map 502 is a down-sampling feature map outputted by the second convolution block, that is, the second down-sampling feature map). By analogy, a feature map 503 and a feature map 504 (the feature map 503 is a down-sampling feature map outputted by the third convolution block, and the feature map 504 is a down-sampling feature map outputted by the fourth convolution block) are obtained. 2×2 up-sampling is performed on the feature map 504 of the fourth convolution block (that is, the last convolution block of the four sequentially connected convolution blocks), to obtain an up-sampling feature map 504' of the fourth convolution block. The up-sampling feature map 504' is combined with the down-sampling feature map 503 of the third convolution block to obtain a corresponding feature map 503' of the third convolution block. Then, 2×2 up-sampling is performed on the corresponding feature map 503' of the third convolution block to obtain an up-sampling feature map of the third convolution block, and the up-sampling feature map of the third convolution block is combined with the down-sampling feature map 502 outputted by the second convolution block to obtain a corresponding feature map 502' of the second convolution block. 2×2 up-sampling is performed on a corresponding feature map 502' of the second convolution block to obtain an up-sampling feature map of the second convolution block, and the up-sampling feature map of the second convolution block is combined with the feature map 501 outputted by the first convolution block to obtain a corresponding feature map 501' of the first convolution block. The feature map 501' is a feature map of the same size as the video image frame 500. Finally, the feature map is inputted into a sigmoid function to obtain an edge segmentation result of the target certificate, that is, a position of a white box line in 505 is the detected position of the target certificate.

In an embodiment of this disclosure, during capture of the video stream or the plurality of certificate images of the target certificate, a flip angle of the target certificate in a video image frame in the captured video stream or in the captured certificate image may further be detected. When the detected flip angle of the target certificate is not in conformity with a flip setting condition, a video stream or a plurality of certificate images may be captured again until the flip angle of the target certificate in the captured video image frame or the captured certificate image is in conformity with the flip setting condition. In some embodiments, when the detected flip angle of the target certificate is excessively large or excessively small, the user may be prompted to perform capture again.

In an embodiment of this disclosure, the detection of the flip angle of the target certificate in the video image frame in the video stream (since the flip angle of the target certificate in the certificate image is detected in a similar manner, description is made using the detection of the flip angle of the target certificate in the video image frame as an example) may be as follows: performing target certificate detection in the video image frame in the video stream to identify a certificate detection box containing the target certificate in the video image frame, and then determining the flip angle of the target certificate in the video image frame according to a side length ratio of the certificate detection box identified in the video image frame.

For example, a ratio of a left side length of the certificate detection box to a left side length of the target certificate may be calculated, and then a first angle is obtained based on an inverse cosine function. Similarly, a ratio of a right side length of the certificate detection box to a right side length of the target certificate may be calculated, and then a second angle is obtained based on an inverse cosine function. A sum of the first angle and the second angle is averaged to obtain the flip angle of the target certificate.

In an embodiment, a ratio of adjacent two side lengths of the certificate detection box and a ratio of two adjacent side lengths of the target certificate may also be calculated, and then the flip angle of the target certificate in each video image frame is determined according to a correspondence between the ratio of two adjacent side lengths of the certificate detection box and the ratio of two adjacent side lengths of the target certificate in each video image frame. For example, a ratio relationship between the ratio of two adjacent side lengths of the certificate detection box and the ratio of two adjacent side lengths of the target certificate is calculated, to determine a flip angle corresponding to the ratio relationship according to the ratio relationship. In this embodiment, the method for determining the flip angle based on the correspondence between the ratio of two adjacent side lengths of the target certificate and the ratio of two adjacent side lengths of the certificate detection box brings better robustness, and is not affected by different sizes of the target certificate in different video image frames.

In an embodiment of this disclosure, each video image frame may be detected using an image detection model. Training samples of the image detection model include video image frame samples labeled with a certificate detection box, and enhanced images obtained by performing image enhancement processing on the video image frame samples. In some embodiments, the video image frame in the video stream may be inputted into the image detection model, and each video image frame may be detected using the image detection model to obtain the certificate detection box containing the target certificate in each video image frame.

In an embodiment of this disclosure, the image detection model may be performance vs accuracy net (PVAnet), which may have a higher speed while maintaining detection precision. In a training process for PVAnet, selected training samples include: video image frame samples labeled with a certificate detection box, and enhanced images obtained by performing image enhancement processing on the video image frame samples. In some embodiments, the enhanced image may be an image obtained by performing image enhancement processing. For example, an enhanced image may be obtained by performing enhancement processing on a video image frame sample using methods such as rotation, brightness, contrast, and noise addition.

Further referring to FIG. 2, in step S220, image feature information of a position of the static anti-counterfeiting point is extracted to obtain a static anti-counterfeiting point feature, and image feature information of a position of the dynamic anti-counterfeiting point and variation feature information of the dynamic anti-counterfeiting point in the plurality of certificate images are extracted to obtain a dynamic anti-counterfeiting point feature. In an example, a static anti-counterfeiting point feature is generated based on image feature information of the static anti-counterfeiting point that is extracted from the document image, and a dynamic anti-counterfeiting point feature is generated based on image feature information of the dynamic anti-counterfeiting point and variation feature information of the dynamic anti-counterfeiting point that are extracted from the subset of the plurality of document images. Each of the image feature information of the dynamic anti-counterfeiting point and the variation feature information of the dynamic anti-counterfeiting point can be determined from the subset of the plurality of document images.

In an embodiment of this disclosure, information of the static anti-counterfeiting point feature is two-dimensional image feature information, and thus the image feature information of the position of the static anti-counterfeiting point may be extracted to serve as the static anti-counterfeiting point feature. For example, the static anti-counterfeiting point feature may be extracted by using a scale-invariant feature transform (SIFT) algorithm. Alternatively, a histogram of oriented gradient (HOG) feature may be extracted to serve as the static anti-counterfeiting point feature, or the static anti-counterfeiting point feature may be extracted by using a two-dimensional convolutional neural network. For the dynamic anti-counterfeiting point, it is necessary to consider not only the image feature information of the position of the static anti-counterfeiting point, but also a time sequence dimension, to capture a variation feature of the dynamic anti-counterfeiting point in a plurality of frames of the video. Specifically, a three-dimensional convolutional network may be used to extract the dynamic anti-counterfeiting point feature, as detailed in the following text.

In step S230, a first authenticity result corresponding to the static anti-counterfeiting point is identified based on the static anti-counterfeiting point feature, and a second authenticity result corresponding to the dynamic anti-counterfeiting point is identified based on the dynamic anti-counterfeiting point feature.

In an embodiment of this disclosure, a first authenticity result corresponding to each static anti-counterfeiting point may be determined according to a first feature value interval in which the static anti-counterfeiting point feature of each static anti-counterfeiting point is located and an authenticity result associated with the first feature value interval. For example, a feature value interval range of the authenticity anti-counterfeiting point may be set in advance, and then the first authenticity result of the static anti-counterfeiting point is determined according to the feature value interval range in which the static anti-counterfeiting point is located.

Similarly, a second authenticity result corresponding to each dynamic anti-counterfeiting point may be determined according to a second feature value interval in which the dynamic anti-counterfeiting point feature of each dynamic anti-counterfeiting point is located and an authenticity result associated with the second feature value interval.

In an embodiment of this disclosure, a method of authenticity classification may also be used to determine the authenticity results of the static anti-counterfeiting point and the dynamic anti-counterfeiting point. For example, a support vector machine (SVM) classifier is used to classify the anti-counterfeiting point as authentic or fake, or a fully connected layer in the neural network is used to classify the anti-counterfeiting point as authentic or fake.

In an embodiment of this disclosure, specified video image frames are extracted from the video stream containing the target certificate as the plurality of certificate images. The specified video image frame may be all of the video image frames in the video stream, or may be one or more video image frames extracted from the video stream according to a specified interval, or may be video image frames in which the target certificate is in a horizontal position. Then, the image feature information of the position of the static anti-counterfeiting point is extracted in the specified video image frame. Based on this, in an embodiment of this disclosure, a to-be-determined authenticity result of the static anti-counterfeiting point in each specified video image frame may be identified according to the static anti-counterfeiting point feature extracted from each specified video image frame. Then, the first authenticity result of the same static anti-counterfeiting point in each specified video image frame may be determined according to the to-be-determined authenticity result of the static anti-counterfeiting point in each specified video image frame. Further, the first authenticity result of each static anti-counterfeiting point on the target certificate may be calculated according to the authenticity result of the same static anti-counterfeiting point in each specified video image frame.

Specifically, for any one video image frame, the technical solution in the foregoing embodiment can be adopted to detect the static anti-counterfeiting point therein, and identify the first authenticity result of the static anti-counterfeiting point therein. Then, the to-be-determined authenticity results of the same static anti-counterfeiting point in the extracted specified video image frames are combined to obtain the first authenticity result of each static anti-counterfeiting point. For example, the to-be-determined authenticity result may be an authenticity confidence level, and then the authenticity confidence levels of the same static anti-counterfeiting points in the specified video image frames may be averaged to obtain an average value used as the first authenticity result of each static anti-counterfeiting point.

If a plurality of certificate images are directly captured to determine the first authenticity result of the static anti-counterfeiting point instead of extracting the specified video image frames from the video stream to determine the first authenticity result of the static anti-counterfeiting point, the specific processing method is similar to the scheme for determining the first authenticity result of the static anti-counterfeiting point by extracting the specified video image frames from the video stream, and details are not described again.

In an embodiment of this disclosure, at least one set of video image frames may be extracted from the video stream containing the target certificate to serve as the plurality of certificate images, and the image feature information of the position of the dynamic anti-counterfeiting point and the variation feature information of the dynamic anti-counterfeiting point may be extracted in the at least one set of video image frames. Based on this, in an embodiment of this disclosure, a to-be-determined authenticity result of the dynamic anti-counterfeiting point in each video image frame may be identified according to the image feature information of the position of the dynamic anti-counterfeiting point and the variation feature information of the dynamic anti-counterfeiting point extracted from each set of video image frames. Then, the second authenticity result of the same dynamic anti-counterfeiting point in each set of video image frames may be determined according to the to-be-determined authenticity result of the dynamic anti-counterfeiting point in each set of video image frames. Further, the second authenticity result of each dynamic anti-counterfeiting point on the target certificate may be calculated according to the to-be-determined authenticity result of the same dynamic anti-counterfeiting point in each set of video image frames.

Specifically, for any set of video image frames, the technical solution in the foregoing embodiment can be adopted to detect the dynamic anti-counterfeiting point therein, and identify the to-be-determined authenticity result of the dynamic anti-counterfeiting point therein. Then, the to-be-determined authenticity results of the same dynamic anti-counterfeiting point in all sets of extracted video image frames are combined to obtain the second authenticity result of each dynamic anti-counterfeiting point. For example, the to-be-determined authenticity result may be an authenticity confidence level, and then the authenticity confidence levels of the same dynamic anti-counterfeiting points in all sets of video image frames may be averaged to obtain an average value used as the second authenticity result of each dynamic anti-counterfeiting point.

If a plurality of certificate images are directly captured to determine the second authenticity result of the dynamic anti-counterfeiting point instead of extracting at least one set of video image frames from the video stream to determine the second authenticity result of the dynamic anti-counterfeiting point, the specific processing method is similar to the scheme for determining the second authenticity result of the dynamic anti-counterfeiting point by extracting at least one set of video image frames from the video stream. For example, at least one set of certificate images may be obtained by division according to the plurality of certificate images, and then authenticity identification is performed. Details are not described again.

In an embodiment of this disclosure, as described in the foregoing embodiments, the dynamic anti-counterfeiting point feature may be extracted through a three-dimensional convolutional network, and the authenticity result corresponding to the dynamic anti-counterfeiting point may also be outputted. Specifically, a plurality of certificate images containing the dynamic anti-counterfeiting point (the plurality of certificate images may be extracted from the video stream containing the target certificate) may be inputted to a three-dimensional convolutional network to extract a multi-dimensional feature map of the dynamic anti-counterfeiting point by using the three-dimensional convolutional network. Then, the multi-dimensional feature map may be converted into a one-dimensional feature map by a down-sampling unit in the three-dimensional convolutional network, to serve as the dynamic anti-counterfeiting point feature. The second authenticity result corresponding to the dynamic anti-counterfeiting point may be outputted through a fully connected layer in the three-dimensional convolutional network.

FIG. 6 is an exemplary schematic diagram of identifying an authenticity result corresponding to a dynamic anti-counterfeiting point by using a three-dimensional convolutional network. As an example, four convolution blocks may be used, which are serialized in sequence. Each convolution block has a structure of conv3d+batch normalization (BN) layer+rectified linear unit (Relu), and feature units of the four convolution blocks correspond to four columns in FIG. 6, respectively. The dashed line connection between convolution features in FIG. 6 is used to represent that a feature unit of a next layer (that is, a cube shown in FIG. 6 represents a unit in a feature map of this layer, and represents a feature unit of three-dimensional convolution) is obtained by convolution of several adjacent feature units of a previous layer. Finally, the multi-dimensional feature map is converted into a one-dimensional feature vector 601, and the authenticity confidence level corresponding to the anti-counterfeiting point is outputted through the fully connected layer. The authenticity confidence level may be in the form of authentic certificate+confidence level or fake certificate+confidence level. For example, authentic certificate 99.3%; fake certificate 0.7%.

Further referring to FIG. 2, in step S240, authenticity of the target certificate or document is determined according to the first authenticity result and second authenticity result.

In an embodiment of this disclosure, when the authenticity result includes the authenticity confidence level, for example, the first authenticity result includes a first authenticity confidence level, and the second authenticity result includes a second authenticity confidence level, the first authenticity confidence level corresponding to the static anti-counterfeiting point and the second authenticity confidence level corresponding to the dynamic anti-counterfeiting point may be weighted according to a weight of the static anti-counterfeiting point and a weight of the dynamic anti-counterfeiting point, to obtain an authenticity confidence level comprehensive value, and then the authenticity of the target certificate may be determined according to the authenticity confidence level comprehensive value.

For example, assuming that the target certificate has one static anti-counterfeiting point and two dynamic anti-counterfeiting points, a weight of a static anti-counterfeiting point a is 0.2, a weight of a dynamic anti-counterfeiting point b is 0.4, and a weight of dynamic anti-counterfeiting point c is 0.4, a first authenticity confidence level of the static anti-counterfeiting point a is authentic certificate 0.7, a second authenticity confidence level of the dynamic anti-counterfeiting point b is fake certificate 0.7, and a second authenticity confidence level of the dynamic anti-counterfeiting point c is 0.5, a confidence level comprehensive value of the target certificate being an authentic certificate may be calculated as follows: $0.2 \times 0.4 + 0.4 \times (1-0.7) + 0.4 \times 0.5 = 0.4$.

After the authenticity confidence level comprehensive value of the target certificate is calculated, the authenticity confidence level comprehensive value may be compared with a preset threshold. When the confidence level comprehensive value of the target certificate being an authentic certificate is greater than the preset threshold, the target certificate is determined to be an authentic certificate. Conversely, when the confidence level comprehensive value of the target certificate being an authentic certificate is less than or equal to the preset threshold, the target certificate is determined as a fake certificate. The preset threshold may be set according to an actual situation.

In summary, the technical solution of the embodiment of this disclosure includes identifying the authenticity of the certificate based on the dynamic anti-counterfeiting point and the static anti-counterfeiting point on the certificate image. For the static anti-counterfeiting point, the image feature information of the position of the static anti-counterfeiting point is considered. For the dynamic anti-counterfeiting point, not only the image feature information of the position of the dynamic anti-counterfeiting point but also the variation feature information of the dynamic anti-counterfeiting point in the plurality of certificate images is considered. The authenticity result corresponding to each static anti-counterfeiting point and the authenticity result corresponding to each dynamic anti-counterfeiting point may be determined first. Then, the authenticity of the target certificate may be identified according to the authenticity result corresponding to each static anti-counterfeiting point and the authenticity result corresponding to each dynamic anti-counterfeiting point, thereby improving the accuracy of the certificate authenticity identification.

Figures 7, 8:
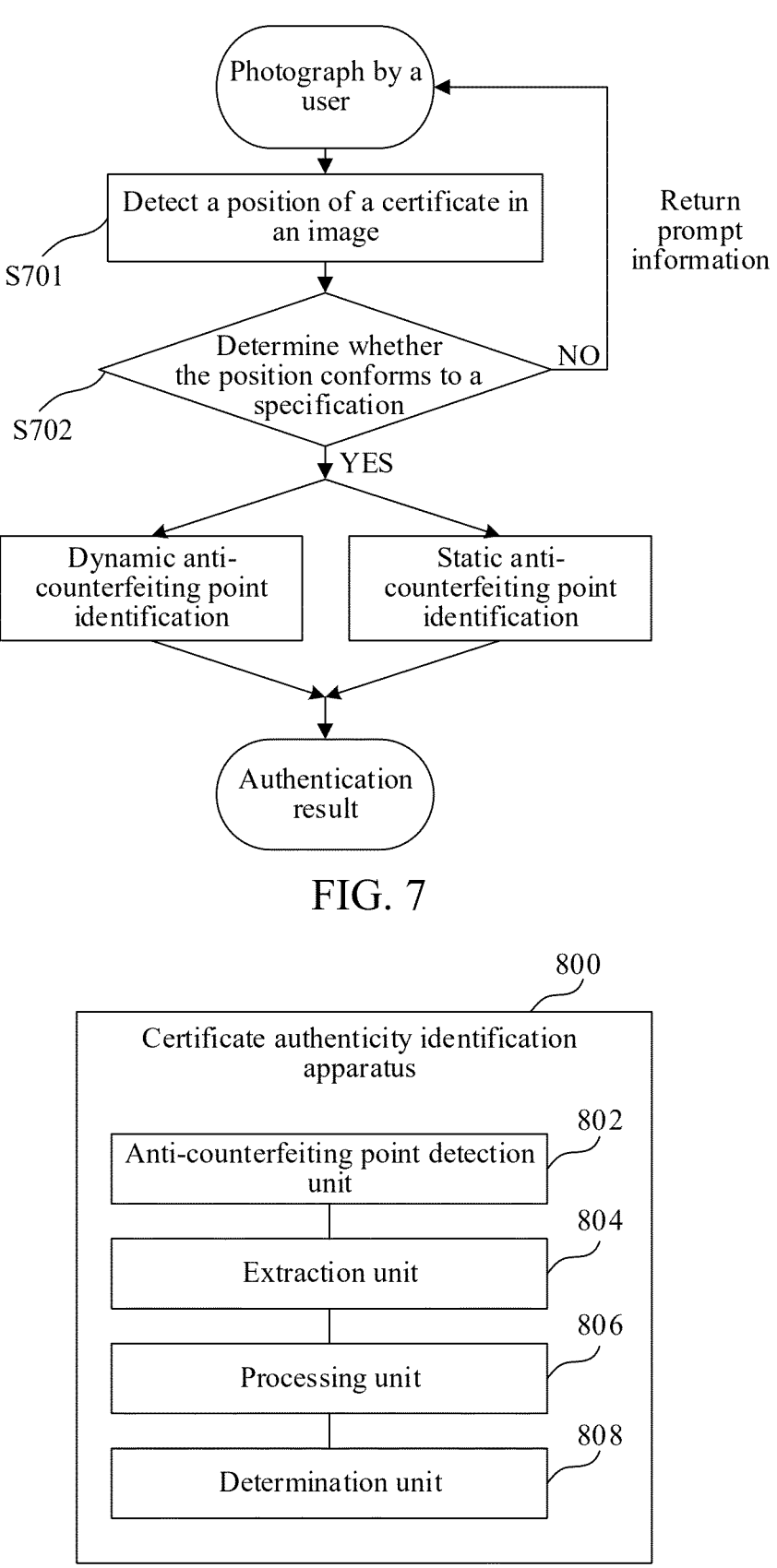
FIG. 7 is a flowchart of a certificate authenticity identification method according to an embodiment of this disclosure.
FIG. 8 is a block diagram of a certificate authenticity identification apparatus according to an embodiment of this disclosure.

As shown in FIG. 7, in an embodiment of this disclosure, the certificate authenticity identification method may include the following steps:

In step S701, a position of a document, such as a certificate, in an image after a user photographs the certificate is detected.

In an embodiment of this disclosure, the user may be guided to hold the certificate and shoot a video according to a specific action. The specific action may be such an action that causes the dynamic anti-counterfeiting point of the certificate to have an obvious change. For example, for Hong Kong ID Card 03 version, dynamic anti-counterfeiting points include color-changing ink, dynamic printed logo "HK", dynamic printed portrait, and the like. These dynamic anti-counterfeiting points have obvious changes when the certificate is flipped up and down. Thus, during video shooting, the user may be guided to flip the certificate upward from a horizontal position in front of a lens, then return the certificate to the original position, and then flip the certificate downward.

In step S702, a determination is made as to whether the position of the certificate in the image conforms to a specification; if yes, identify a dynamic anti-counterfeiting point and a static anti-counterfeiting point, and obtain an authentication result of the certificate based on an identification result of the dynamic anti-counterfeiting point and an identification result of the static anti-counterfeiting point; when the position of the certificate in the image does not conform to the specification, return a prompt message to allow the user to shoot a video again.

In an embodiment of this disclosure, the position of the certificate in the video image frame in the shot video is acquired to determine whether the position conforms to the specification. To acquire the position of the certificate, an algorithm such as Hoff's linear detection may be selected to detect four sides of the certificate, and obtain position coordinates of the certificate by combining the four sides. Alternatively, a neural network method may be used, such as the target segmentation method shown in FIG. 5, or a target detection method with higher precision may be used. After the position of the certificate is acquired, it can be determined whether the certificate is removed from the screen, excessively far away or excessively close, or the like, to determine whether the certificate image conforms to the specification. When the certificate image does not conform to the specification, corresponding prompt information may be returned to guide the user to shoot a video again. In addition, certificate flip angle information may also be acquired to determine whether the flip angle is excessively large or excessively small. When the flip angle is excessively large or excessively small, corresponding prompt information may be returned to guide the user to shoot a video again.

In an embodiment of this disclosure, the dynamic anti-counterfeiting point changes when the certificate is located at different angles or under different lighting. For example, a laser flower marker of Hong Kong ID Card 18 version changes more obviously under different lighting, and a dynamic printed logo "HK" in Hong Kong ID Card 03 version presents different "H" or "K" characters at different angles. The static anti-counterfeiting point is an anti-counterfeiting feature that does not change due to different angles or lighting, and is mostly a textured character. For example, a rainbow printed anti-counterfeiting point of Hong Kong ID Card 03 version uses a micro-writing technology. Thus, it is necessary to identify the dynamic anti-counterfeiting point and the static anti-counterfeiting point respectively. Before identification, the feature information of the static anti-counterfeiting point and the dynamic anti-counterfeiting point shall be extracted first. As for the specific extraction process and the identification process of the anti-counterfeiting point, reference may be made to the technical solutions of the foregoing embodiments, and details are not repeated here.

Since the identification of the static anti-counterfeiting point is performed for a single-frame image, the identification of the static anti-counterfeiting point may be performed for each frame of the shot video. Alternatively, frames may be sampled at intervals for identification, and an average value is taken to obtain the identification result of the static anti-counterfeiting point, which brings better robustness. Alternatively, specific frames may be extracted for identification, such as horizontal frames, which achieves higher efficiency while ensuring a certain precision. For the dynamic anti-counterfeiting point, since it is necessary to input multiple frames of images to identify the variation feature of the dynamic anti-counterfeiting point, all video image frames of the shot video may be inputted to perform identification segment by segment, or several sets of different video image frames are randomly selected for identification, and then an average value is taken as the identification result of the dynamic anti-counterfeiting point.

After the identification results of each static anti-counterfeiting point and each dynamic anti-counterfeiting point are obtained, according to the importance and effect of each static anti-counterfeiting point and each dynamic anti-counterfeiting point, corresponding weights may be adjusted to calculate a cumulative sum to obtain a final certificate authenticity score. For example, a same weight may be assigned to all the anti-counterfeiting points on the certificate, that is, a final authenticity confidence level of the certificate is obtained by taking an average level, then a corresponding threshold is set, and the threshold is compared with the final authenticity confidence level of the certificate to obtain a final authentication result: that is, to determine whether the certificate is authentic or fake.

The following describes apparatus embodiments of this disclosure, which may be used for performing the certificate authenticity identification method in the foregoing embodiments of this disclosure. For details not disclosed in the apparatus embodiments of this disclosure, refer to the embodiments of the foregoing certificate authenticity identification method of this disclosure.

FIG. 8 is a block diagram of a document authenticity identification apparatus, such as a certificate authenticity identification apparatus, according to an embodiment of this disclosure, which may be arranged in a device having a computing processing function, such as in the server 103 or the terminal 101 shown in FIG. 1. One or more modules, submodules, and/or units of the apparatus can be implemented by processing circuitry, software, or a combination thereof, for example.

Referring to FIG. 8, a certificate authenticity identification apparatus 800 according to an embodiment of this disclosure includes: an anti-counterfeiting point detection unit 802, an extraction unit 804, a processing unit 806, and a determination unit 808.

The anti-counterfeiting point detection unit 802 is configured to detect a dynamic anti-counterfeiting point and a static anti-counterfeiting point in each of a plurality of certificate images of a target certificate, the plurality of certificate images being obtained by capturing images of the target certificate from different angles. The extraction unit 804 is configured to extract image feature information of a position of the static anti-counterfeiting point to obtain a static anti-counterfeiting point feature, and extract image feature information of a position of the dynamic anti-counterfeiting point and variation feature information of the dynamic anti-counterfeiting point in the plurality of certificate images to obtain a dynamic anti-counterfeiting point feature. The processing unit 806 is configured to identify a first authenticity result corresponding to the static anti-counterfeiting point based on the static anti-counterfeiting point feature, and identify a second authenticity result corresponding to the dynamic anti-counterfeiting point based on the dynamic anti-counterfeiting point feature. The determination unit 808 is configured to determine authenticity of the target certificate according to the first authenticity result and the second authenticity result.

In some embodiments of this disclosure, based on the foregoing solutions, the certificate authenticity identification apparatus 800 further includes: a capture unit, a position detection unit, and an acquisition unit. The capture unit is configured to capture a video stream containing the target certificate from different angles. The position detection unit is configured to detect a position of the target certificate in a video image frame in the video stream. The capture unit is further configured to: re-capture a video stream containing the target certificate from different angles if the position detection unit detects that the position of the target certificate is not in conformity with a position setting condition. The acquisition unit is configured to: acquire the plurality of certificate images from the video image frames in the video stream in response to detecting that the position of the target certificate is in conformity with the position setting condition.

In some embodiments of this disclosure, based on the foregoing solutions, the position detection unit is configured to: perform down-sampling processing on the video image frame by using sequentially connected n convolution blocks to obtain n down-sampling feature maps corresponding to the n convolution blocks in a one-to-one manner, where the first convolution block of the n convolution blocks is used to perform down-sampling processing on the video image frame, and an (i+1)-th convolution block of the n convolution blocks is used to perform down-sampling processing on a down-sampling feature map of an i-th convolution block, $n>1$, and $0<i<n$; perform up-sampling processing sequentially according to the corresponding down-sampling feature maps by using the n convolution blocks, where an n-th convolution block performs up-sampling processing on an n-th down-sampling feature map to obtain an n-th up-sampling feature map, an i-th down-sampling feature map and an up-sampling feature map of the (i+1)-th convolution block are combined to obtain a corresponding feature map of the i-th convolution block, and up-sampling processing is performed on the corresponding feature map of the i-th convolution block by using the i-th convolution block to obtain an up-sampling feature map of the i-th convolution block, the up-sampling processing and the down-sampling processing having a same sampling scale; and identify, according to a corresponding feature map of the first convolution block of the n convolution blocks, the position of the target certificate in the video image frame.

In some embodiments of this disclosure, based on the foregoing solutions, the certificate authenticity identification apparatus 800 further includes: an angle detection unit, configured to detect a flip angle of the target certificate in a video image frame in the video stream, where the capture unit is further configured to re-capture a video stream containing the target certificate until a flip angle of a target certificate in the captured video image frame is in conformity with the flip setting condition, when the detected flip angle of the target certificate is not in conformity with a flip setting condition.

In some embodiments of this disclosure, based on the foregoing solutions, the angle detection unit is configured to: perform target certificate detection in a video image frame in the video stream to identify a certificate detection box containing the target certificate in the video image frame; and determine, according to a side length ratio of the certificate detection box, a flip angle of the target certificate in the video image frame.

In some embodiments of this disclosure, based on the foregoing solutions, the process in which the extraction unit 804 extracts the image feature information of the position of the dynamic anti-counterfeiting point and the variation feature information of the dynamic anti-counterfeiting point in the plurality of certificate images to obtain the dynamic anti-counterfeiting point feature, and the process in which the processing unit 806 identifies the authenticity result corresponding to each dynamic anti-counterfeiting point based on the dynamic anti-counterfeiting point feature include: inputting the plurality of certificate images containing the dynamic anti-counterfeiting point to a three-dimensional convolutional network to extract a multi-dimensional feature map of the dynamic anti-counterfeiting point by using the three-dimensional convolutional network; and converting the multi-dimensional feature map into a one-dimensional feature map to serve as the dynamic anti-counterfeiting point feature by using a down-sampling unit in the three-dimensional convolutional network, and outputting the second authenticity result corresponding to the dynamic anti-counterfeiting point through a fully connected layer in the three-dimensional convolutional network.

In some embodiments of this disclosure, based on the foregoing solutions, the processing unit 806 is configured to: determine the first authenticity result corresponding to the static anti-counterfeiting point according to a first feature value interval in which the static anti-counterfeiting point feature of the static anti-counterfeiting point is located and an authenticity result associated with the first feature value interval; and determine the second authenticity result corresponding to the dynamic anti-counterfeiting point according to a second feature value interval in which the dynamic anti-counterfeiting point feature of the dynamic anti-counterfeiting point is located and an authenticity result associated with the second feature value interval.

In some embodiments of this disclosure, based on the foregoing solutions, the plurality of certificate images include: specified video image frames extracted from the video stream containing the target certificate. The specified video image frames include any one of the following: each video image frame in the video stream, one or more video image frames extracted from the video stream according to a specified interval, or video image frames in which the target certificate is in a horizontal position; and the extraction unit 804 is configured to extract, in the specified video image frame, the image feature information of the position of the static anti-counterfeiting point to obtain the static anti-counterfeiting point feature.

In some embodiments of this disclosure, based on the foregoing solutions, the processing unit 806 is configured to: identify, based on the static anti-counterfeiting point feature extracted from the specified video image frame, a to-be-determined authenticity result of the static anti-counterfeiting point in the specified video image frame; and determine, according to the to-be-determined authenticity result of the static anti-counterfeiting point in the specified video image frame, a first authenticity result of the same static anti-counterfeiting point in each specified video image frame.

In some embodiments of this disclosure, based on the foregoing solutions, the plurality of certificate images include: extracting at least a set of video image frames from the video stream containing the target certificate as the plurality of certificate images; and the extraction unit 804 is configured to extract, in the at least a set of video image frames, the image feature information of the position of the dynamic anti-counterfeiting point and the variation feature information of the dynamic anti-counterfeiting point to obtain the dynamic anti-counterfeiting point feature.

In some embodiments of this disclosure, based on the foregoing solutions, the processing unit 806 is configured to: when a plurality of sets of video image frames are extracted from the video stream containing the target certificate, identify, based on the image feature information of the position of the dynamic anti-counterfeiting point and variation feature information of the dynamic anti-counterfeiting point that are extracted from the plurality of sets of video image frames, to-be-determined authenticity results of the dynamic anti-counterfeiting point in the plurality of sets of video image frames; and determine, according to the to-be-determined authenticity result of the dynamic anti-counterfeiting point in each set of video image frames, a second authenticity result of the same dynamic anti-counterfeiting point in each set of video image frames.

In some embodiments of this disclosure, based on the foregoing solutions, the first authenticity result includes a first authenticity confidence level, and the second authenticity result includes a second authenticity confidence level. The determination unit 808 is configured to: weigh the corresponding first authenticity confidence level and second authenticity confidence level according to a weight of the static anti-counterfeiting point and a weight of the dynamic anti-counterfeiting point to obtain an authenticity confidence level comprehensive value; and determine the authenticity of the target certificate according to the authenticity confidence level comprehensive value.

Figure 9:
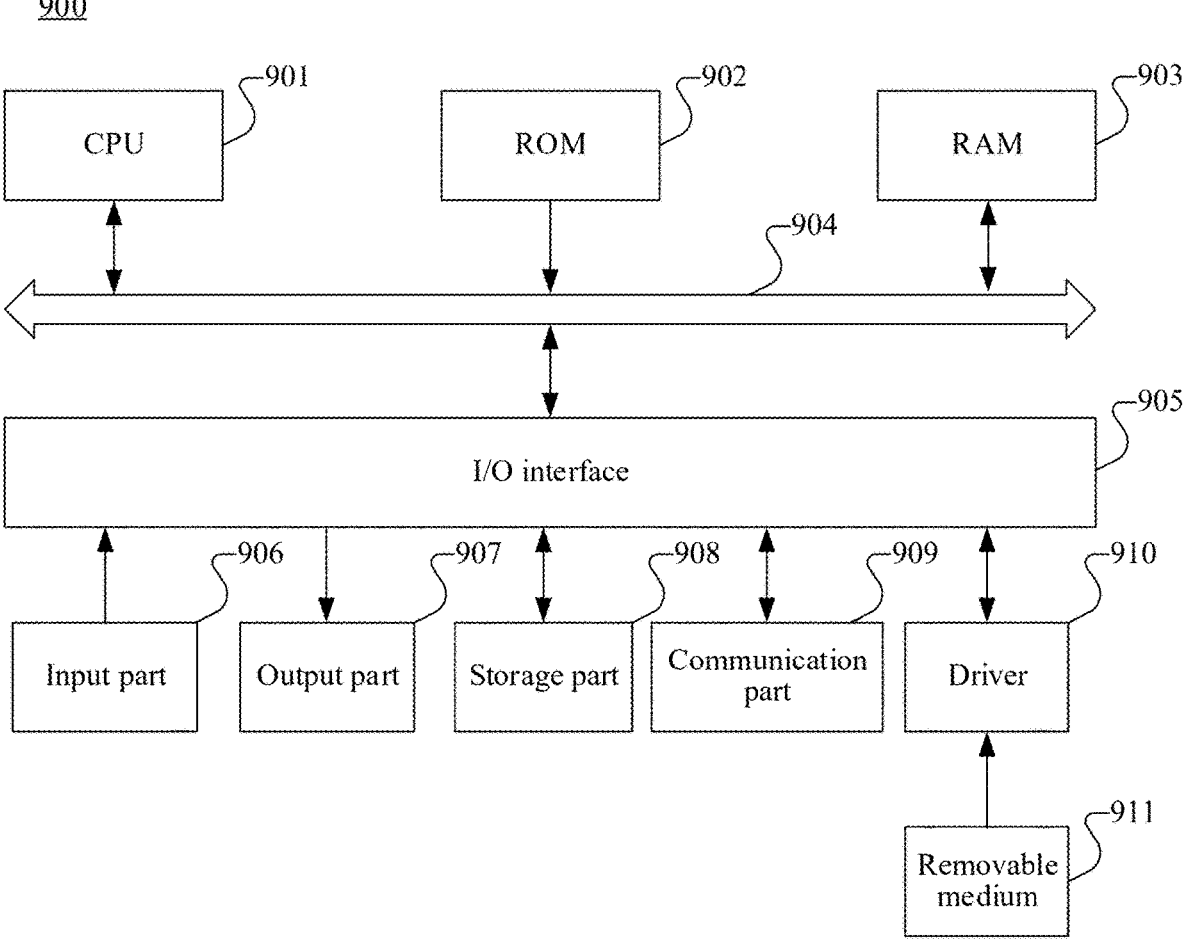
FIG. 9 is a schematic structural diagram of a computer system adapted to implement an electronic device according to an embodiment of this disclosure.

FIG. 9 shows a schematic structural diagram of a computer system adapted to implement an electronic device according to an embodiment of this disclosure.

A computer system 900 of the electronic device shown in FIG. 9 is merely an example, and does not constitute any limitation on functions and use ranges of the embodiments of this disclosure.

As shown in FIG. 9, the computer system 900 includes processing circuitry, such as a central processing unit (CPU) 901, which may perform various suitable actions and processing based on a program stored in a read-only memory (ROM) 902 or a program loaded from a storage part 908 into a random access memory (RAM) 903, for example, perform the method described in the foregoing embodiments. The RAM 903 further stores various programs and data required for system operations. The CPU 901, the ROM 902, and the RAM 903 are connected to each other through a bus 904. An input/output (I/O) interface 905 is also connected to the bus 904.

The following components are connected to the I/O interface 905: an input part 906 including a keyboard, a mouse, or the like, an output part 907 including a cathode ray tube (CRT), a liquid crystal display (LCD), a speaker, or the like, a storage part 908 including a hard disk, or the like, and a communication part 909 including a network interface card such as a local area network (LAN) card or a modem. The communication part 909 performs communication processing by using a network such as the Internet. A driver 910 is also connected to the I/O interface 905 as required. A removable medium 911, such as a magnetic disk, an optical disc, a magneto-optical disk, or a semiconductor memory, is installed on the driver 910 as required, so that a computer program read from the removable medium is installed into the storage part 908 as required.

Particularly, according to an embodiment of this disclosure, the processes described above by referring to the flowcharts may be implemented as computer software programs. For example, an embodiment of this disclosure includes a computer program product. The computer program product includes a computer program stored in a computer-readable medium. The computer program includes a computer program used for performing a method shown in the flowchart. In such an embodiment, the computer program may be downloaded and installed from a network through the communication part 909, and/or installed from the removable medium 911. When the computer program is executed by the CPU 901, the various functions defined in the system of this disclosure are executed.

The computer-readable medium shown in the embodiments of this disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In this disclosure, the computer-readable storage medium may be any tangible medium containing or storing a program, and the program may be used by or used in combination with an instruction execution system, apparatus, or device. In this disclosure, the computer-readable signal medium may include a data signal transmitted in a baseband or as part of a carrier, and stores a computer-readable computer program. The data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including but not limited to: a wireless medium, a wired medium, or the like, or any suitable combination thereof.

The flowcharts and block diagrams in the accompanying drawings illustrate possible system architectures, functions, and operations that may be implemented by a system, a method, and a computer program product according to various embodiments of this disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Related units described in the embodiments of this disclosure may be implemented in a software manner, or may be implemented in a hardware manner, and the unit described can also be set in a processor. Names of these units do not constitute a limitation on the units in a case.

In another aspect, this disclosure further provides a computer readable medium. The computer readable medium may be included in the electronic device described in the above embodiments, or may exist alone without being assembled into the electronic device. The computer-readable medium carries one or more programs, the one or more programs, when executed by the electronic device, causing the electronic device to implement the method described in the foregoing embodiments.

An embodiment of this disclosure further provides a computer program product including instructions, the instructions, when run on a computer, causing the computer to perform the method according to the foregoing embodiments.

Although several modules or units of a device for action execution are mentioned in the foregoing detailed descriptions, the division is not mandatory. Actually, according to the implementations of this disclosure, the features and functions of two or more modules or units described above may be specified in one module or unit. Conversely, features and functions of one module or unit described above may be further divided into a plurality of modules or units to be specified.

Through the descriptions of the foregoing implementations, a person skilled in the art easily understands that the exemplary implementations described herein may be implemented through software, or may be implemented through software located in combination with necessary hardware. Therefore, the technical solutions of the implementations of this disclosure may be implemented in a form of a software product. The software product may be stored in a non-volatile storage medium (which may be a CD-ROM, a USB flash drive, a removable hard disk, or the like) or on a network, including several instructions for instructing a computing device (which may be a personal computer, a server, a touch terminal, a network device, or the like) to perform the methods according to the implementations of this disclosure.

After considering the specification and practicing the disclosed implementations, a person skilled in the art may easily conceive of other implementations of this disclosure. This disclosure is intended to cover any variations, uses, or adaptive changes of this disclosure following the general principles of this disclosure, and includes well-known knowledge and conventional technical means in the art and undisclosed in this disclosure.

This disclosure is not limited to the accurate structures that are described above and that are shown in the accompanying drawings, and modifications and changes may be made without departing from the scope of this disclosure.

What is claimed is:

1. A document authenticity identification method, comprising:

determining a flip angle of a document for authentication in a video based on a size first angle obtained according to a first side length ratio of the document and a second angle obtained according to a second side length ratio of the document;

detecting, by processing circuitry, a position requirement of the document for the authentication in the video, the position requirement including the flip angle of the document in the video;

based on the document in the video not meeting the position requirement, prompting a user to re-capture the document in another video until the flip angle of the document meets the position requirement; and based on the document in the video meeting the position requirement, detecting a dynamic anti-counterfeiting point in each document image of a plurality of document images from the video, the plurality of document images including images of different angles of the document;

detecting a static anti-counterfeiting point in each document image of the plurality of document images;

generating, by the processing circuitry, a static anti-counterfeiting point feature based on image feature information of the static anti-counterfeiting point that is extracted from a document image of the plurality of document images;

generating, by the processing circuitry, (i) a dynamic anti-counterfeiting point feature based on image feature information of the dynamic anti-counterfeiting point and (ii) variation feature information of the dynamic anti-counterfeiting point based on differences between the plurality of document images, each of the image feature information of the dynamic anti-counterfeiting point and the variation feature information of the dynamic anti-counterfeiting point being determined from the plurality of document images;

determining a first authenticity result corresponding to the static anti-counterfeiting point based on the static anti-counterfeiting point feature;

determining a second authenticity result corresponding to the dynamic anti-counterfeiting point based on the dynamic anti-counterfeiting point feature; and determining authenticity of the document based on the first authenticity result and the second authenticity result.

2. The document authenticity identification method according to claim 1, further comprising:

capturing the video of the document; and acquiring the plurality of document images from video image frames of the video in response to detecting that the position requirement of the document is met.

3. The document authenticity identification method according to claim 2, wherein the detecting the position requirement of the document further comprises:

performing down-sampling processing on a video image frame of the video image frames by using sequentially connected n convolution blocks to obtain n down-sampling feature maps corresponding to the n convolution blocks in a one-to-one manner, a first convolution block of the n convolution blocks being configured to perform down-sampling processing on the video image frame, and an (i+1)-th convolution block of the n convolution blocks being configured to perform down-sampling processing on a down-sampling feature map of an i-th convolution block, n>1, and 0<i<n;

performing up-sampling processing sequentially according to the corresponding down-sampling feature maps by using the n convolution blocks, an n-th convolution block being configured to perform up-sampling processing on an n-th down-sampling feature map to obtain an n-th up-sampling feature map, an i-th down-sampling feature map and an up-sampling feature map of the (i+1)-th convolution block are combined to obtain a corresponding feature map of the i-th convolution block, and up-sampling processing is performed on the corresponding feature map of the i-th convolution block by using the i-th convolution block to obtain an up-sampling feature map of the i-th convolution block, the up-sampling processing and the down-sampling processing having a same sampling scale; and identifying, according to a corresponding feature map of the first convolution block of the n convolution blocks, the position requirement of the document in the video image frame.

4. The document authenticity identification method according to claim 1, wherein the detecting the flip angle of the document comprises:

performing document detection in the video to identify a document detection box containing the document in the video; and determining, according to the first side length ratio of the document detection box and the second side length ratio of the document detection box, the flip angle of the document in the video.

5. The document authenticity identification method according to claim 1, wherein the extracting the image feature information of the dynamic anti-counterfeiting point and the variation feature information of the dynamic anti-counterfeiting point comprises:

inputting the plurality of document images including the dynamic anti-counterfeiting point into a three-dimensional convolutional network to extract a multi-dimensional feature map of the dynamic anti-counterfeiting point; and converting the multi-dimensional feature map into a one-dimensional feature map used as the dynamic anti-counterfeiting point feature by using a down-sampling unit in the three-dimensional convolutional network; and the determining the second authenticity result comprises:

outputting, through a fully connected layer in the three-dimensional convolutional network, the second authenticity result corresponding to the dynamic anti-counterfeiting point.

6. The document authenticity identification method according to claim 1, wherein the determining the first authenticity result includes determining the first authenticity result corresponding to the static anti-counterfeiting point according to a first feature value interval in which the static anti-counterfeiting point feature is located and an authenticity result associated with the first feature value interval; and the determining the second authenticity result includes determining the second authenticity result corresponding to the dynamic anti-counterfeiting point according to a second feature value interval in which the dynamic anti-counterfeiting point feature is located and an authenticity result associated with the second feature value interval.

7. The document authenticity identification method according to claim 1, wherein the document image of the plurality of document images is a video image frame in which the document is determined to be in a horizontal position.

8. The document authenticity identification method according to claim 1, wherein the determining the first authenticity result comprises:

determining, based on the static anti-counterfeiting point feature extracted from the document image of the plurality of document images, an authenticity result of the static anti-counterfeiting point in the document image; and determining, according to authenticity results of the static anti-counterfeiting point in different document images of the plurality of document images, the first authenticity result of the static anti-counterfeiting point.

9. The document authenticity identification method according to claim 1, wherein the determining the second authenticity result comprises:

determining, based on the image feature information of the dynamic anti-counterfeiting point and the variation feature information of the dynamic anti-counterfeiting point that are extracted from a plurality of subsets of the plurality of images, authenticity results of the dynamic anti-counterfeiting point in the plurality of subsets of the document images; and determining, according to the authenticity results of the dynamic anti-counterfeiting point in the plurality of subsets of the document images, the second authenticity result of the dynamic anti-counterfeiting point in the plurality of subsets of the document images.

10. The document authenticity identification method according to claim 1, wherein the first authenticity result includes a first authenticity confidence level, and the second authenticity result includes a second authenticity confidence level; and the determining the authenticity of the document comprises:

weighing the first authenticity confidence level according to a weight of the static anti-counterfeiting point and the second authenticity confidence level according to a weight of the dynamic anti-counterfeiting point to obtain an authenticity confidence level comprehensive value; and determining the authenticity of the document according to the authenticity confidence level comprehensive value.

11. An information processing apparatus, comprising:
determine a flip angle of a document for authentication in a video based on a size first angle obtained according to a first side length ratio of the document and a second angle obtained according to a second side length ratio of the document;
processing circuitry configured to:
    detect a position requirement of the document for the authentication in the video, the position requirement including the flip angle of the document in the video;
    based on the document in the video not meeting the position requirement,
        prompt a user to re-capture the document in another video until the flip angle of the document being met the position requirement; and
    based on the document in the video meeting the position requirement,
        detect a dynamic anti-counterfeiting point in each document image of a plurality of document images from the video, the plurality of document images including images of different angles of the document;
        detect a static anti-counterfeiting point in each document image of the plurality of document images;
        generate a static anti-counterfeiting point feature based on image feature information of the static anti-counterfeiting point that is extracted from a document image of the plurality of document images;
        generate (i) a dynamic anti-counterfeiting point feature based on image feature information of the dynamic anti-counterfeiting point and (ii) variation feature information of the dynamic anti-counterfeiting point based on differences between the plurality of document images, each of the image feature information of the dynamic anti-counterfeiting point and the variation feature information of the dynamic anti-counterfeiting point being determined from the plurality of document images;
        determine a first authenticity result corresponding to the static anti-counterfeiting point based on the static anti-counterfeiting point feature;
        determine a second authenticity result corresponding to the dynamic anti-counterfeiting point based on the dynamic anti-counterfeiting point feature; and
        determine authenticity of the document based on the first authenticity result and the second authenticity result.

12. The information processing apparatus according to claim 11, wherein the processing circuitry is configured to:
    capture the video of the document; and
    acquire the plurality of document images from video image frames of the video in response to detecting that the position requirement of the document is met.

13. The information processing apparatus according to claim 12, wherein the processing circuitry is configured to:
    perform down-sampling processing on a video image frame of the video image frames by using sequentially connected n convolution blocks to obtain n down-sampling feature maps corresponding to the n convolution blocks in a one-to-one manner, a first convolution block of the n convolution blocks being configured to perform down-sampling processing on the video image frame, and an (i+1)-th convolution block of the n convolution blocks being configured to perform down-sampling processing on a down-sampling feature map of an i-th convolution block, n>1, and 0<i<n;
    perform up-sampling processing sequentially according to the corresponding down-sampling feature maps by using the n convolution blocks, an n-th convolution block being configured to perform up-sampling processing on an n-th down-sampling feature map to obtain an n-th up-sampling feature map, an i-th down-sampling feature map and an up-sampling feature map of the (i+1)-th convolution block are combined to obtain a corresponding feature map of the i-th convolution block, and up-sampling processing is performed on the corresponding feature map of the i-th convolution block by using the i-th convolution block to obtain an up-sampling feature map of the i-th convolution block, the up-sampling processing and the down-sampling processing having a same sampling scale; and
    identify, according to a corresponding feature map of the first convolution block of the n convolution blocks, the position requirement of the document in the video image frame.

14. The information processing apparatus according to claim 11, wherein the processing circuitry is configured to:
    perform document detection in the video to identify a document detection box containing the document in the video; and
    determine, according to the first side length ratio of the document detection box and the second side length ratio of the document detection box, the flip angle of the document in the video.

15. The information processing apparatus according to claim 11, wherein the processing circuitry is configured to:
    input the plurality of document images including the dynamic anti-counterfeiting point into a three-dimensional convolutional network to extract a multi-dimensional feature map of the dynamic anti-counterfeiting point;
    convert the multi-dimensional feature map into a one-dimensional feature map used as the dynamic anti-counterfeiting point feature by using a down-sampling unit in the three-dimensional convolutional network; and
    output, through a fully connected layer in the three-dimensional convolutional network, the second authenticity result corresponding to the dynamic anti-counterfeiting point.

16. The information processing apparatus according to claim 11, wherein the processing circuitry is configured to:
    determine the first authenticity result corresponding to the static anti-counterfeiting point according to a first feature value interval in which the static anti-counterfeiting point feature is located and an authenticity result associated with the first feature value interval; and
    determine the second authenticity result corresponding to the dynamic anti-counterfeiting point according to a second feature value interval in which the dynamic anti-counterfeiting point feature is located and an authenticity result associated with the second feature value interval.

17. The information processing apparatus according to claim 11, wherein the document image of the plurality of document images is a video image frame in which the document is determined to be in a horizontal position.

18. A non-transitory computer-readable storage medium storing instructions which when executed by a processor cause the processor to perform:

determining a flip angle of a document for authentication in a video based on a size first angle obtained according to a first side length ratio of the document and a second angle obtained according to a second side length ratio of the document;

detecting a position requirement of the document for the authentication in the video, the position requirement including the flip angle of the document in the video;

based on the document in the video not meeting the position requirement, prompting a user to re-capture the document in another video until the flip angle of the document meets the position requirement; and based on the document in the video meeting the position requirement, detecting a dynamic anti-counterfeiting point in each document image of a plurality of document images from the video, the plurality of document images including images of different angles of the document;

detecting a static anti-counterfeiting point in each document image of the plurality of document images;

generating a static anti-counterfeiting point feature based on image feature information of the static anti-counterfeiting point that is extracted from a document image of the plurality of document images;

generating (i) a dynamic anti-counterfeiting point feature based on image feature information of the dynamic anti-counterfeiting point and (ii) variation feature information of the dynamic anti-counterfeiting point based on differences between the plurality of document images, each of the image feature information of the dynamic anti-counterfeiting point and the variation feature information of the dynamic anti-counterfeiting point being determined from the plurality of document images;

determining a first authenticity result corresponding to the static anti-counterfeiting point based on the static anti-counterfeiting point feature;

determining a second authenticity result corresponding to the dynamic anti-counterfeiting point based on the dynamic anti-counterfeiting point feature; and determining authenticity of the document based on the first authenticity result and the second authenticity result.

19. The non-transitory computer-readable storage medium according to claim 18, wherein the instructions further cause the processor to perform:

capturing the video of the document; and acquiring the plurality of document images from video image frames of the video in response to detecting that the position requirement of the document is met.

20. The non-transitory computer-readable storage medium according to claim 18, wherein the detecting the flip angle of the document comprises:

performing document detection in the video to identify a document detection box containing the document in the video; and determining, according to the first side length ratio of the document detection box and the second side length ratio of the document detection box, the flip angle of the document in the video.

\* \* \* \* \*